Jan. 28, 1964

R. GERBER ETAL 3,119,281

FEED MECHANISM

Filed Sept. 12, 1960

INVENTORS
Roger Gerber
Stephan L. Barth
BY
Roy C. Hopgood
ATTORNEY

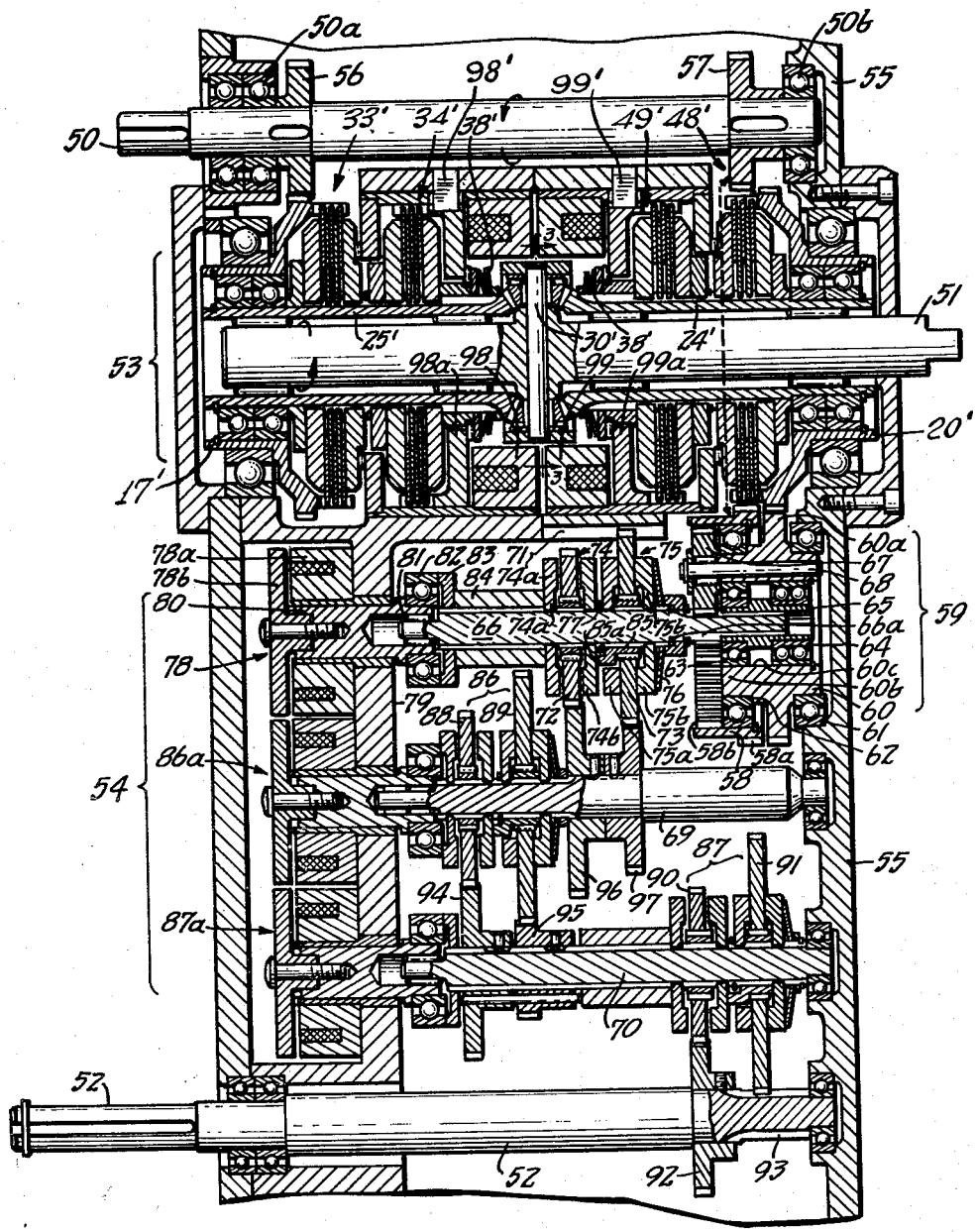

United States Patent Office 3,119,281
Patented Jan. 28, 1964

3,119,281
FEED MECHANISM
Roger Gerber, Kensington, and Stephan L. Barth, New Britain, Conn., assignors to The New Britain Machine Company, New Britain, Conn., a corporation of Connecticut
Filed Sept. 12, 1960, Ser. No. 55,450
11 Claims. (Cl. 74—665)

This invention relates to selective transmissions for providing a range of controlled output speeds for machine tools or the like.

In machine tools such as, for example, screw machines including multiple spindle screw machines, it is required for efficient operation that a relatively wide range of speeds be available for coordinated drive of the work and the tool carrier, the latter desirably being movable at different speeds for infeed to the work, for working travel, and for backing off. While it is possible using conventional selective transmissions to obtain a wide range of speed selections, the number of transmission parts and shifting actions required makes it impractical in most cases to provide the necessary number of speeds together with the desired speed coordination, particularly when more than one motor or driving source is used in the machine tool.

An object of the present invention is to provide an improved selective transmission simpler than and superior to conventional transmissions in requiring considerably fewer parts and shifting actions for affording a plurality of selective output motions.

An object of the invention is to provide an improved power transmission, specifically one involving a variously clutchable differential, whereby a continuous or constant speed rotary input can be converted, selectively to a relatively large number of output speeds, including zero, without generating high inertia loads within the system.

Another object of the invention is to provide an improved selective transmission whereby a constant rotary speed can be continuously modulated, specifically with the aid of planetary gearing, to provide a variable output speed.

Another object of the invention is to provide a selective transmission adapted for control by a binary program code.

Another object of the invention is to provide for machine tools or the like an improved selective transmission affording coordination between the motions of the work and the cutting tool or the like, and more specifically involving a highly selective change gear arrangement between the work drive means and the tool drive means, wherein $2^n$ speed variations are selectable, with "$n$" being the number of change gear units.

The invention provides a selective transmission for the conversion of a continuous input motion or motions to any one of a plurality of output motions including rotary motions in either direction as well as zero motion. Rotary input motion is imparted, in an arrangement of the invention, to a first rotary sleeve through a multiple clutch system, one stage or section of which provides a direct input drive coupling to the sleeve and another section of which has a brake function to couple the sleeve to a stationary frame member, the two sections operating in mutual in-out relation. A second such sleeve carrying a second multiple clutch is rotatively mounted in axial line with the first sleeve, and the two sleeves have journaled therein an ouput shaft. The two sleeves are associated by a differential gear system including a sun gear on each sleeve and an array of planet gears supported by the output shaft.

The second sleeve, preferably driven at a different speed from the first sleeve, is also selectively coupled through its associated multiple clutch to its driving source or to the frame. By operating the two multiple clutch brake systems in various combinations, the input motions can be variously applied through the differential gearing to the output shaft to drive the shaft in either direction at high speed, or to clamp it against motion, or to rotate it at low speed suitable, for example, to feeding of a cutting, or threading, tool slowly into a workpiece. The system further provides for operation of the second sleeve from a variable speed drive such as a selective transmission arrangement, particularly a variable speed arrangement between a work driving shaft and a tool or tool carriage driving shaft, whereby the second sleeve can be driven at any of a plurality of speeds so that the range of speeds of the output shaft will be substantially multiplied.

The above and other features and objects of the present invention will be readily understood by those skilled in the art having reference to the accompanying drawings illustrating preferred embodiments of the invention, the specification being taken in conjunction with the accompanying drawings, in which:

FIG. 1 is a view in vertical section taken through the longitudinal axis of a selective transmission system;

FIG. 2 is a view in vertical section, developed into a common vertical plane of a selective transmission system affording a relatively large range of output characteristics and representing a modification of an arrangement of FIG. 1.

Figure 3:
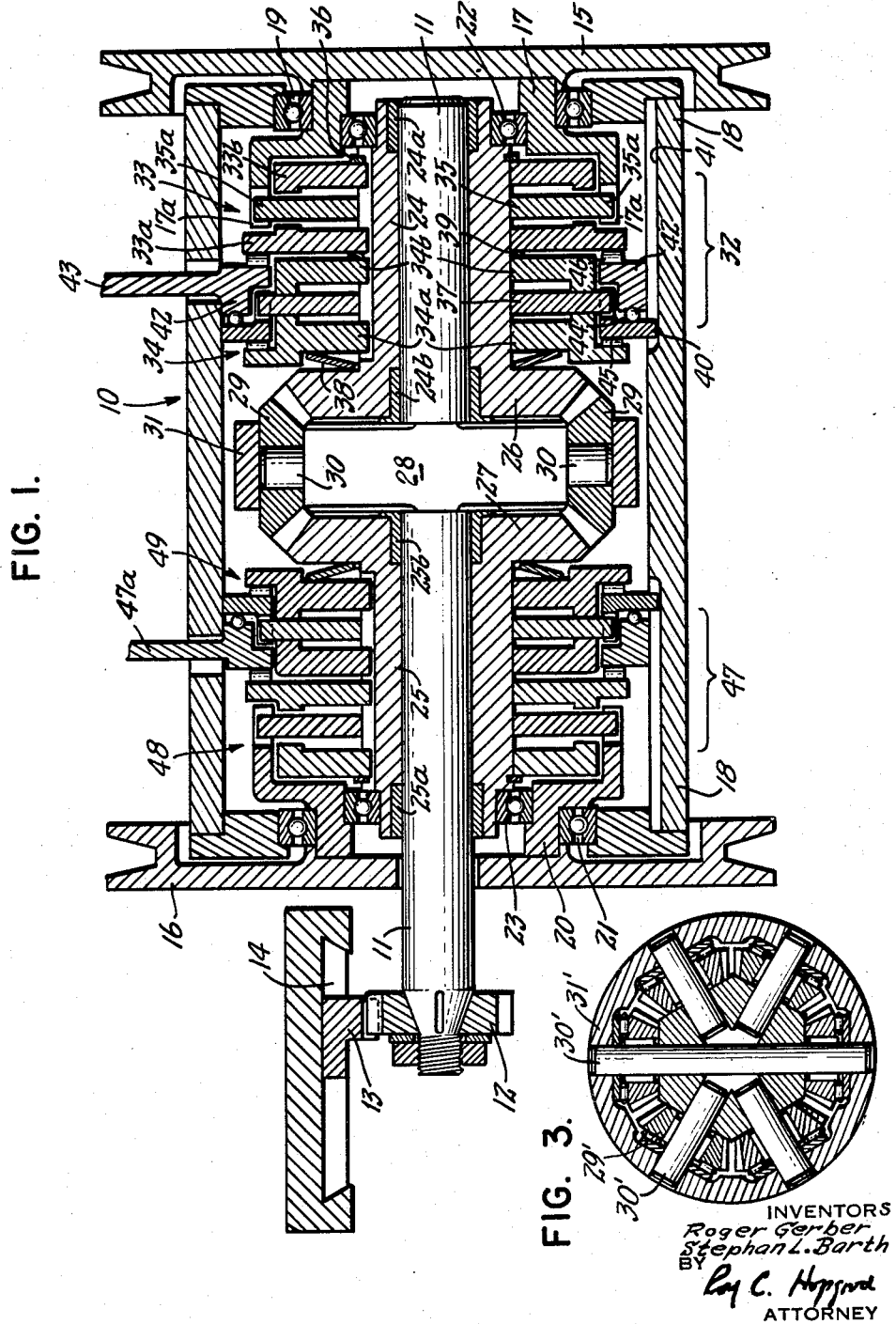
FIG. 3 is a fragmentary view in vertical section taken on the line 3—3 of FIG. 2, looking in the direction of the arrows.

Referring first to FIG. 1, there is illustrated a selective transmission system taking the form of a gear box indicated generally by the numeral 10 adapted to convert duplex input rotations selectively into a plurality of output rotations in either direction, and the output appearing in a rotary shaft 11. In the illustrated arrangement, the output shaft 11 is shown coupled through a gear 12 and a rack 13 to a slide 14 of a machine tool, such as a lathe, for example.

Constant rotary input motion is introduced into the system through a pulley wheel 15. A second input motion, preferably selectively variable, is introduced into the system through a pulley wheel 16.

The pulley wheel 15 is attached to a driving cup 17 supported in the frame or housing 18 of the gear box 10 by means of a ball bearing assembly 19. Similarly, the pulley wheel 16 is attached to a driving cup 20 supported in the housing 18 by a ball bearing assembly 21. The two driving cups 17 and 20 support, through rotary bearing assemblies 22 and 23 respectively, a rotary assembly including a pair of aligned sleeve members 24 and 25 and, within the sleeves, the output shaft 11. Suitable bearings 24a and 24b and 25a and 25b are interposed between the output shaft 11 and the respective sleeves 24 and 25.

The sleeve 24 forms the hub of a bevel sun gear 26 and the sleeve 25 is the hub of a facing bevel sun gear 27 of the same size. The shaft 11 rigidly extends in opposite directions from a planetary gear carrier 28 between the facing sun gears 26 and 27. Meshed with the sun gears is an array of planetary bevel gears 29 rotatably mounted on axles 30 radially projecting from carrier 28. A ring cage 31 for the planetary gears is supported by the axles 30.

Mounted on sleeve 24 is a first unitary clutch brake system designated generally by 32 and involving a clutch stage 33 and an alternatively effective, companion brake stage 34. The clutch stage 33 includes a disk 35 free on the sleeve 24 and located between friction disks 33a and 33b keyed to the sleeve. Disk 35 has peripheral fingers 35a intermeshed with fingers 17a of driving cup 17, so that the driving cup directly drives the disk 35. Members 33a, 35 and 33b have limited axial play, limited in right hand direction by means including an abutment ring 36. The brake section 34 includes a central braking disk 37 free on sleeve 24 and flanked by friction disks 34a and 34b keyed to the sleeve. A spring washer 38 biases the member 34a against the member 37 which in turn presses against the member 34b. The member 37 is held against rotative movement relative to the frame 18 by interdigited connection with a ring member 40 having a key fit in a keyway 41 of the frame, permitting the ring member only axial play. An axial thrust member 42 is mounted in the frame 18 for limited turning movement therein by an actuator 43. Opposed faces of holding member 40 and the thrust member 42 are formed with complementary axially inclined ball tracking cam means 44. A thrust bearing 45 is interposed between the non-rotating member 40 and the friction disk 34a and a similar thrust bearing 46 is disposed between the member 42 and the friction disk 33a of the first clutch stage. By rocking the actuator 43, the axially inclined cam means 44 acts to spread the members 40 and 42 apart, moving the member 34a out of friction engagement with the brake disk 37 and concurrently pressing the member 33a against the disk 35 which in turn is pressed against the member 33b. These actions, which take place against the resistance of spring 38, thus result in the disengagement of the sleeve 24 from the brake stage 34 and the concurrent engagement of the sleeve with the driving clutch stage 33. It is seen that there is a mutual in-out relation between the two sections of the multiple clutch; whenever one is in or engaged, the other is out or disengaged.

A duplicate, mirror image, unitary clutch brake assembly 47 is disposed on the sleeve 25 and includes a clutch stage 48 for selectively coupling the sleeve to the driving cup 20 and an alternatively effective, paired brake stage 49 for selectively coupling the sleeve to the frame to brake and arrest sleeve rotation. The unitary clutch-brake 47 includes an actuator 47a having the same clutch to brake or brake to clutch function as actuator 43 of the other unitary clutch-brake 32.

In operation, assuming an input drive is continuously applied to the pulley 15 in clockwise direction and a second input drive at a lower speed is continuously applied to the pulley 16 in a counterclockwise direction, both as viewed from the right hand end of the gear box, then by manipulation of the actuators 43 and 47a, a plurality of selective motions for the tool slide 14 are obtained. By moving the actuators 43 and 47a so that clutch stage 33 is coupled to the sleeve 24 and the brake stage 49 is holding the sleeve 25 against rotation, the shaft is rotated clockwise, through the action of sun gear 26 turning the planetary gears 29 and causing them to revolve around the stationary sun gear 27. This condition produces the most rapid travel of the slide 14 in feed direction. As the slide brings the cutting tool (not shown) close to the work, the actuator 47a is moved to release the brake stage 49 from the sleeve 25 and at the same time engage the driving clutch stage 48 to the sleeve. Differential action immediately results in the differential gearing 26—27—29 such as to cause the shaft 11 to continue to rotate clockwise but at a much lower speed than before, the slower speed being a function of the difference between the speed of clockwise rotation of the sleeve 24 and the lesser speed of counterclockwise rotation of the sleeve 25. The reduced speed of the shaft 11 results in slow feed of the slide 14 and the tool thereon through the work-performing range. At the end of the work performing travel of the slide, the actuator 43 is rocked to cause the brake stage 34 to engage and the drive clutch stage 33 to disengage, so that the sleeve 24 is now arrested. Consequently, the sun gear 27 drives the planetary gears 29 around the stationary sun gear 27 in counterclockwise direction, and the resulting counterclockwise rotation of shaft 11 produces rapid return travel of the tool slide 14. By moving both actuators 43 and 47a to engage the two brake stages 34 and 49, movement of shaft 11 is stopped, though the pulleys 15 and 16 remain in continuous motion. It will be observed that because there are two positions for each of the actuators 43 and 47a, the selective transmission system is capable of simple, two-digit binary code programming.

Clutch-brake assemblies of the general type shown and described herein are disclosed per se, in co-pending application, Serial No. 737,720, filed May 26, 1958 and assigned to the assignee of the instant application.

Referring now to FIG. 2, there is illustrated a selective transmission system for use, for example, in a machine tool such as a bar or chucking machine wherein a transmission system could be provided for each of the tool-carrying slides, and which includes a constant speed input shaft 50 adapted to be coupled at all times to the main motor of the machine tool, an output shaft 51 adapted to be coupled to a movable part such as, for example, a tool carrier or a threading tool slide (not shown) to be moved in both directions and at different speeds, and a second shaft 52 adapted to be coupled directly to the work spindle, also not shown. The first portion of the transmission system indicated generally by numeral 53 controls the speed and direction of rotation of the output shaft 51 based on principles of operation similar to those of FIG. 1 described above. The second portion of the transmission system indicated generally by numeral 54 controls the rotational speed ranges for the output shaft 51, primarily during the slow-feed phase of operation, when both clutches 33'—48' are engaged to drive members 17' and 20' at the same speed and in opposite directions.

The input shaft 50 is rotatably supported in bearings 50a and 50b in a frame or housing 55, the shaft having secured thereto a first driving gear 56 representing the constant speed input to the first portion 53 of the transmission system, and a second gear 57 which is part of the variable or differential speed input. In the drawing, the gear 57 is shown, because of the developed nature of the view, disengaged from the sleeve gear member 58. Actually, the gear 57, disposed at the upper end of the drawing, meshes with the gear portion 58a of the sleeve gear 58, which is one input member for a planetary gear system indicated generally by the numeral 59. The planetary gear system 59 includes a rotary output member 60 rotatably supported in the housing 55 by a ball bearing assembly 61. The member 60 includes a gear portion 60a and an axially extending shoulder 60b on which the sleeve gear 58 is rotatably mounted by a bearing assembly 62. The member 60 also takes the form of a sleeve, the central, cylindrical opening 60c of which supports bearing assemblies 63 and 64, the latter being a bi-directional thrust bearing, supporting a rotatable sleeve 65 which is keyed or splined to one end of an intermediate drive shaft 66 to turn therewith. The shaft 66 is formed with gear teeth 66a which constitute the sun gear portion of the planetary system 59. Meshing with the sun gear 66a are a plurality of planetary gears 67 rotatably supported on axles or pins 68 fitted in and supported by the rotary member 60. The input sleeve gear 58 includes, in addition to the external gear portion 58a (which meshes with the driving gear 57) an internal, ring gear 58b which meshes with the planetary gears 67. In this fashion, depending upon the speed of rotation of the sun gear 66a and hence the shaft 66, a range of speeds of rotation for the member 60, including the gear 60a are achieved. The gear 60a actuates the drive cup 20' to provide the second variable input to the selective transmission portion 53. The drive cup 20' corresponds to drive cup 20 in the FIG. 1 system.

The intermediate shaft 66 is coupled to the shaft 52, which is coupled directly to the spindle, through the selective transmission portion 54, including, in addition to the intermediate shaft 66, intermediate shafts 69 and 70. The shaft 66 carries a multiple clutch system 71 including two driven gears 72 and 73 of different size and adapted to be selectively coupled to the shaft 66 by the clutch stages 74 and 75, respectively. The gear 72 is embraced by a pair of friction members 74a and 74b keyed to the shaft 66 to turn therewith and normally out of clutching engagement with the gear 72, which is freely rotatably mounted on the shaft. Similarly, the gear 73 is embraced by a pair of friction members 75a and 75b, also keyed to the shaft 66 to turn therewith and movable axially thereon. The friction member 75b is normally urged axially against the gear 73 by a compressed spring washer 76, preferably a Belleville spring. The thrust of the spring 76 is transmitted across the gear 73 to the friction member 75a, which is backed up by an abutment ring 77 fixed to the shaft 66. In this fashion, the gear 73 is normally clutched to the shaft 66. The multiple clutch system 71 is actuated by an electromagnetic means taking the form of a solenoid 78 having a fixed field structure 78a and an axially movable armature 78b. The solenoid 78 is carried by a frame part or wall 79 and the armature 78b is coupled to the multiple clutch system 71 through a thrust sleeve 80 (in which the inner end of the shaft 66 is rotatably mounted by a bearing assembly 81), a thrust bearing 82, a thrust washer or cup 83, and a slide member 84, all having freedom for axial movement. The sleeve 84 abuts against the friction member 74a and normally, in the absence of energization of the solenoid 78, transmits no thrust thereto. The friction member 74b of the clutch stage 74 is coupled to the friction member 75b of the clutch stage 75 by a thrust sleeve 85 including a plurality of axial fingers 85a. Energization of the solenoid 78 therefore drives the sleeve 84 against the friction member 74a which frictionally engages the gear 72, forcing it against the companion friction member 74b to couple the gear 72 to the shaft 66. The thrust of the clutch element 74b is however taken up by the thrust sleeve 85 which moves axially to force the friction member 75b out of frictional engagement with the gear 75 by further deflecting the spring 76. Thus, the gear 73 is freed from the shaft 66 while the load of the spring 76 continues to provide the clutching force for the now engaged clutch stage 74.

The intermediate shafts 69 and 70 carry similar multiple clutch assemblies 86 and 87, the former including gears 88 and 89 of different size and the latter gears 90 and 91, also of different size. The gears 90 and 91, which are selectively clutchable to the shaft 70 mesh with gears 92 and 93 on the shaft 52. The shaft 70 has gears 94 and 95 affixed thereto which mesh with the gears 88 and 89 of the multiple clutch 86. Lastly, the shaft 69 has affixed thereto gears 96 and 97 which mesh with the gears 72 and 73 of the multiple clutch system 71. The multiple clutch system 86 and 87 are respectively actuated by electromagnetic actuators 86a and 87a, which are substantially the same as the actuator 78 described above.

It is seen that the gears 92 and 93 on shaft 52 co-act with gears 90 and 91 on shaft 70 to provide a change gear connection between these two shafts. Similarly gears 94—95 and gears 88—89 provide a change gear connection between shafts 70 and 69, while gears 96—97 with gears 72—73 afford a change gear connection between shafts 69 and 66. For each change gear connection, there is a shifting magnet. In general terms, for "n" number of change gear connections, there are "n" shift magnets, operable in $2^n$ combinations to provide $2^n$ selective speeds between the shaft 52 and the shaft 66.

It will be understood, therefore, that in this specific embodiment where $n=3$, for any given speed of rotation of the input shaft 52, eight different speeds can be achieved for the shaft 66 of the planetary system 59. The several speeds are attained by selectively energizing the actuators associated with the several multiple clutches 71, 86, and 87. Because each solenoid includes two positions, each can be controlled through a binary code so that a three-digit binary code on a tape, for example, can be used to actuate the selective transmission portion 54.

The output speed of the planetary system 59, appearing in the gear 60a is a function of the speed of rotation of the sleeve gear 58 and the shaft 66, and determines the input speed of drive element 20' of the selective transmission portion 53. It will be recalled that the selective transmission portion 53 is basically the same as that of FIG. 1 and like parts thereof are identified by like primed reference numerals. The system differs in that a pair of electromagnetic actuators 98 and 99 replace the mechanical actuators 43 and 47a. These electromagnetic actuators 98 and 99 include armatures 98a and 99a (keyed, at 98'—99', against rotation) which, when pulled inwardly as viewed in the drawing, deflect the thrust springs 38' to release the brake stages 34' and 49' which are normally effective to couple the hub sleeves 25' and 24' to the frame 55. When the armatures 98a and 99a are attracted to release the brake stages, the companion clutch stages 33' and 48' become effective to couple the driving cups 17' and 20' to the rotary sleeves 25' and 24' respectively. As in the system of FIG. 1 three speeds are attainable in the shaft 51, in addition to zero speed. These correspond to fast feed, slow feed, and fast withdrawal of a cutting tool, for example.

These are attained by selecting various combinations of clutches and brakes, all as described above. The actuation of the electromagnetic actuators 98 and 99 is also binary in nature and a two-digit binary code can be used to program them through their entire range of selections. The four output characteristics at shaft 51, namely, (1) zero speed, (2) rapid approach through clutch 33', (3) rapid drawback through clutch 48' of the transmission portion 53, and (4) the eight selective feed speeds through the transmission section 54 and planetary set 59, combine to yield a total of seventeen different speeds for output shaft 51, it being understood that for the rapid drawback, the slow R.P.M. through the transmission 54 and planetary set are added or subtracted from the fast R.P.M. of output shaft 51, depending on which direction the input shaft 52 is driven. This results in slight but negligible variations in the fast-drawback speed of output shaft 51; for practical purposes, these slight variations may be construed as a single useful speed, making a total of eleven useful speeds. If desired, the eight variations in rapid drawback may be eliminated by providing a clutch to stop input shaft 52 during rapid drawback, in which case the rapid-drawback speed of output shaft 51 would be precisely the same as rapid-approach speed. Thus, a total of five binary codes can be used to operate the entire system through very precise speed changes including direction reversals. Because most of the parts of the entire selective transmission system remain in continuous motion, inertia loads on the working parts are minimized, as is the change-over time.

It is understood that changes in the devices illustrated and described can be made by those skilled in the art without departing from the scope of the invention as indicated by the claims.

We claim:
1. Selective transmission apparatus comprising a frame, a rotary output member, and first and second rotary input members supported in the frame, differential gear means coupling the two input members differentially to the output member, first unitary clutch brake means shiftable as a unit to selectively couple or to brake the first input member with respect to a first driving source, second unitary clutch brake means similarly shiftable as a unit to selectively couple or to brake the second input member with respect to a second driving source, and means including an individual mechanical shifting device for each said unitary clutch-brake means for shifting the first and second clutch brake means individually, each as a unit, whereby a plurality of output characteristics are attainable through the differential gear means.

2. Selective transmission apparatus comprising a frame, a rotary output member and first and second rotary input members supported in the frame, differential gear means coupling the two input members differentially to the output member, first selective unitary clutch brake means including companion first and second sections involving a first section to couple the first input member to the frame to arrest its motion in a braking action and a second section alternatively effective to couple the first input member to a rotary driving source, second selective unitary clutch brake means including companion first and second sections involving a first section to couple the second input member to the frame to arrest its motion in a braking action and a second section alternatively effective to couple the second input member to a rotary driving source, and means, including a single actuator for each said clutch-brake means, to actuate the first and second clutch brake means individually the actuator for each clutch-brake means having one position for rendering effective the first section thereof and conjointly rendering ineffective the companion second section and having an alternative position for rendering ineffective the first section and conjointly rendering effective the companion section.

3. Selective transmission apparatus comprising a frame, a rotary output member and first and second rotary input members coaxial with the output member, differential gear means coupling the two input members differentially to the output member, said gear means including a planetary portion to drive the output member and a pair of sun portions driven by the respective input members, first clutch brake means including companion clutch and brake sections respectively to couple the first input member to a rotation source or to brake the first input member and operatively mechanically associated for conjoint operation either to clutch-enabled and brake disengaged condition or to alternative clutch-disabled and brake-engaged condition, second clutch brake means also including companion operatively mechanically associated clutch and brake sections respectively to couple the second input member to a rotation source and to brake the second input member and conjointly operable to either of the aforesaid conditions, and means to operate the first and second clutch brake means selectively to achieve with the aid of the differential gear means at least four different selection modes of operation of the output member.

4. Selective transmission apparatus comprising a frame, an output shaft and first and second rotary input members supported in the frame, first and second unitary clutch brake systems related, respectively, with the first and second rotary input members, each clutch brake system including a brake section having one part coupled to a normally fixed reference and a complementary part coupled to the corresponding input member, each system further including a clutch section having one part coupled to a normally rotating drive source and a complementary part coupled to the corresponding input member, and first and second actuating means associated respectively with the first and second multiple clutch brake systems, each actuating means having one position for enabling the brake section of the associated system while rendering the clutch section ineffective and having an alternative position for enabling the clutch section and rendering the brake section ineffective, whereby the respective input members can be selectively coupled to said drive sources or said normally fixed reference, and differential gear means connecting the output shaft differentially to said first and second rotary input members.

5. Apparatus as set forth in claim 4, said differential gear means comprising first and second sun gears movable with the first and second rotary input members, respectively, and an array of planetary gears meshing with both sun gears and rotatably mounted on radial axes carried by said output shaft.

6. Apparatus as set forth in claim 4, including variable speed means to drive at least one of the input members, said variable speed means comprising a plurality of rotary shafts, each carrying at least a pair of driving gears of different diameter, and a plurality of multiple clutch systems on the respective shafts, and actuating means for the multiple clutch systems to selectively couple one of each pair of gears to a corresponding shaft.

7. Selective transmission apparatus comprising a frame, an output shaft and first and second rotary input members supported in the frame, first and second clutch-brake systems associated respectively with the first and second input members, each system including a brake section having one part coupled to a normally fixed reference, a complementary part coupled to the corresponding input member, and a clutch section having one part coupled to a normally rotating drive source and a complementary part coupled to the corresponding input member, and first and second actuating means associated respectively with the first and second clutch-brake systems whereby the respective input members can be selectively coupled to said drive sources or said normally fixed reference, and differential gear means connecting the output shaft differentially to said first and second rotary input members, said differential gear means comprising first and second sun gears movable with the first and second rotary input members, respectively, an array of planetary gears meshing with both sun gears and rotatably mounted on radial axes carried by said output shaft, variable speed means to drive at least one of the input members, said variable speed means comprising a plurality of rotary shafts, each carrying at least a pair of driving gears of different diameters, and a plurality of multiple clutch systems on the respective rotary shafts, and actuating means for the multiple clutch systems to selectively couple one of each pair of gears to a corresponding one of the rotary shafts, the apparatus further including a planetary gear system coupling one of said rotary shafts to one of said input members.

8. Apparatus as set forth in claim 7, said planetary gear system including a sun gun gear driven by said one shaft, an array of planetary gears carried on the rotatable support coupled to one of said rotary input members, a ring gear meshing with said planetary gears, and common drive means for the other of said rotary input members and said ring gear.

9. Selective transmission apparatus for controlling the work feed of a machine tool selectively in fast feed, slow feed, withdrawal, and dwell, while the transmission is being continuously driven, comprising a movable tool carrier, a rotary output member to drive the tool carrier, a pair of co-axially arranged rotary input members, normally constantly rotating drive elements coaxial with the input members, one element adapted to rotate one input member in one direction and the other element adapted to rotate the other input member in the other direction, differential gear means to couple the two input members differentially to the output member, and a pair of clutch-brake systems associated respectively with the input members and operative to couple the input members selectively to a fixed reference or to their related drive elements.

10. Apparatus as set forth in claim 9, said rotary input members comprising a pair of axially spaced sleeves, said output member comprising a shaft rotatably supported by the sleeves, said planetary gear system being disposed between the sleeves and including a pair of facing sun gears respectively carried by the sleeves and planet gears carried by the shaft, and each clutch-brake system including ring type clutch and brake devices on the sleeve of the associated input member.

11. Selective transmission apparatus for controlling feed of a machine tool by an output shaft for rapid advance, slow working travel, rapid retraction, and dwell, and in coordinated relation to a work spindle drive shaft, comprising first and second rotary input members and means including a differential gear system connecting the input members to said output shaft, a plurality of successive change gear shafts between the work spindle drive shaft and one of said input members, each change gear shaft having shiftable speed ratio change gearing connections with a next of the change gear shafts, and a plurality of electrical gear shift controls, one for each of "$n$" number of said change gearing connections, and operable in $2^n$ combinations to enable selection among $2^n$ speed ratios between the work spindle drive shaft and the connected one of the input members to the output shaft.

References Cited in the file of this patent

UNITED STATES PATENTS

| | | |
|---|---|---|
| 2,372,226 | Robin et al. | Mar. 27, 1945 |
| 2,377,354 | Merritt | June 5, 1945 |
| 2,658,405 | Dodge | Nov. 10, 1953 |
| 2,692,516 | O'Leary | Oct. 26, 1954 |